(12) United States Patent
Ruhland et al.

(10) Patent No.: US 9,297,327 B2
(45) Date of Patent: Mar. 29, 2016

(54) OPERATION OF AN INTERNAL COMBUSTION ENGINE

(71) Applicant: Ford Global Technologies, LLC, Dearborn, MI (US)

(72) Inventors: Helmut Hans Ruhland, Eschweiler (DE); Albert Breuer, Cologne (DE); Thomas Lorenz, Cologne (DE); Moritz Klaus Springer, Hagen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 360 days.

(21) Appl. No.: 13/851,014

(22) Filed: Mar. 26, 2013

(65) Prior Publication Data
US 2013/0255631 A1   Oct. 3, 2013

(30) Foreign Application Priority Data
Mar. 27, 2012   (DE) .......................... 10 2012 204 885

(51) Int. Cl.
| | | |
|---|---|---|
| *F02D 41/14* | (2006.01) | |
| *F01N 11/00* | (2006.01) | |
| *F02D 41/30* | (2006.01) | |
| *F02D 13/02* | (2006.01) | |
| *F02D 41/00* | (2006.01) | |

(52) U.S. Cl.
CPC .............. *F02D 41/30* (2013.01); *F01N 11/007* (2013.01); *F02D 13/0203* (2013.01); *F02D 13/0261* (2013.01); *F02D 41/1441* (2013.01); *F02D 41/1454* (2013.01); *F02D 41/1463* (2013.01); *F02D 13/0276* (2013.01); *F02D 41/0002* (2013.01); *F02D 41/0007* (2013.01); *F02D 2041/001* (2013.01)

(58) Field of Classification Search
CPC . F02D 41/30; F02D 41/1441; F02D 41/0002; F02D 2041/001; F02D 13/00; F02D 41/1454; F02D 41/1463; F02D 41/1475; F02D 41/1495; F02D 41/0007; F02D 13/0261; F02D 13/0203; F02D 13/0276; F02D 13/0257; F01N 11/007
USPC ........ 123/305, 76, 559.1, 90.16; 60/299, 270, 60/285
See application file for complete search history.

(56) References Cited

U.S. PATENT DOCUMENTS

| | | | | |
|---|---|---|---|---|
| 4,217,866 A | * | 8/1980 | Nakajima | ............... F02B 31/00 123/26 |
| 5,784,879 A | * | 7/1998 | Dohta | ................... F01N 11/007 60/276 |

(Continued)

FOREIGN PATENT DOCUMENTS

| | | |
|---|---|---|
| DE | 69630251 T2 | 5/2004 |
| JP | 2010270651 A * | 12/2010 |

*Primary Examiner* — Lindsay Low
*Assistant Examiner* — George Jin
(74) *Attorney, Agent, or Firm* — Greg Brown; Alleman Hall McCoy Russell & Tuttle LLP

(57) ABSTRACT

Methods and systems are provided for accurately measuring an air-fuel-ratio of an engine. During a first condition of decreased scavenging, adjusting fuel injection based on a more-upstream air-fuel ratio, and during a second condition of increased scavenging, adjusting fuel injection based on one or more more-downstream air-fuel ratios and not based on the more-upstream air-fuel ratio. During the first condition, adjusting fuel injection may be further based on the one or more more-downstream air-fuel ratios.

20 Claims, 4 Drawing Sheets

(56) References Cited

U.S. PATENT DOCUMENTS

| | | | |
|---|---|---|---|
| 7,275,516 B1* | 10/2007 | Cunningham | F02D 13/0261 123/305 |
| 2007/0125350 A1* | 6/2007 | Morita | F01L 13/0015 123/679 |
| 2007/0157604 A1* | 7/2007 | Kakuya | F02D 13/0246 60/285 |
| 2007/0186902 A1* | 8/2007 | Zhu et al. | 123/406.34 |
| 2009/0138172 A1* | 5/2009 | Okazaki et al. | 701/103 |
| 2010/0162689 A1* | 7/2010 | Hokuto et al. | 60/287 |
| 2010/0170460 A1* | 7/2010 | Leone | F02D 13/0249 123/90.16 |
| 2013/0184972 A1* | 7/2013 | Suzuki | F02D 41/30 701/104 |
| 2014/0331651 A1* | 11/2014 | Nishikiori | F02D 41/1475 60/285 |
| 2015/0204249 A1* | 7/2015 | Glugla | F02B 37/168 123/90.15 |

\* cited by examiner

OPERATION OF AN INTERNAL COMBUSTION ENGINE

CROSS REFERENCE TO RELATED APPLICATIONS

The present application claims priority to German Patent Application No. 102012204885.5, filed on Mar. 27, 2012, the entire contents of which are hereby incorporated by reference for all purposes.

FIELD

The present disclosure relates to methods and systems for operating an internal combustion engine.

BACKGROUND AND SUMMARY

Controlling air-fuel ratio in internal combustion engines can help to reduce exhaust emissions and increase engine efficiency. Various approaches for engine operation and exhaust monitoring have been developed for vehicle internal combustion engines, including air-fuel ratio control strategies based on measured exhaust air-fuel ratios downstream from the engine. For example, exhaust gas oxygen sensors upstream from an emission control device may be used to infer engine and exhaust air-fuel ratios, and exhaust gas oxygen sensors upstream and downstream from an emission control device may be used to infer useful life of the emission control device. In response to the measured air-fuel ratios, engine operating conditions can be manipulated to maintain efficient engine operation and to control exhaust emissions.

The inventors herein have recognized issues with the above approaches. Namely, during engine operating conditions with increased scavenging, air-fuel ratios measured upstream from an emission control device may not be equivalent to in-cylinder air-fuel ratios due to pass-through of intake air at the engine cylinder during scavenging and inhomogeneous mixing in the exhaust upstream of the emission control device near the engine cylinders. Thus, air-fuel sensors positioned at the exhaust upstream from an emission control device may measure leaner than actual air-fuel ratios. Furthermore, air-fuel sensors positioned at the exhaust close to the engine cylinder may also measure leaner than actual air-fuel ratios due to sensor measurement errors caused by the presence of uncombusted fuel components in the exhaust. As a result, basing engine operation on an air-fuel ratio measured upstream of an emission control device may reduce scavenging capabilities in order to maintain operation of the engine at stoichiometric air-fuel levels. Furthermore, because scavenging cylinder exhaust gas can help to increase engine efficiency, and reduce engine knocking, especially at low engine speeds, operating an engine based on air-fuel ratios measured upstream of an emission control device may reduce overall engine performance.

One approach that at least partially addresses the above issues comprises a method for an engine, comprising during a first condition comprising decreased scavenging, adjusting fuel injection based on a more-upstream air-fuel ratio, and during a second condition comprising increased scavenging, adjusting fuel injection based on one or more more-downstream air-fuel ratios and not based on the more-upstream air-fuel ratio. Furthermore, during the first condition, adjusting fuel injection may be further based on one or more more-downstream air-fuel ratios. In this manner, an internal combustion engine may be operated with increased scavenging capabilities, higher efficiency, and with reduced emissions, as compared to engine operation based on measuring air-fuel ratios solely upstream of an emission control device.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
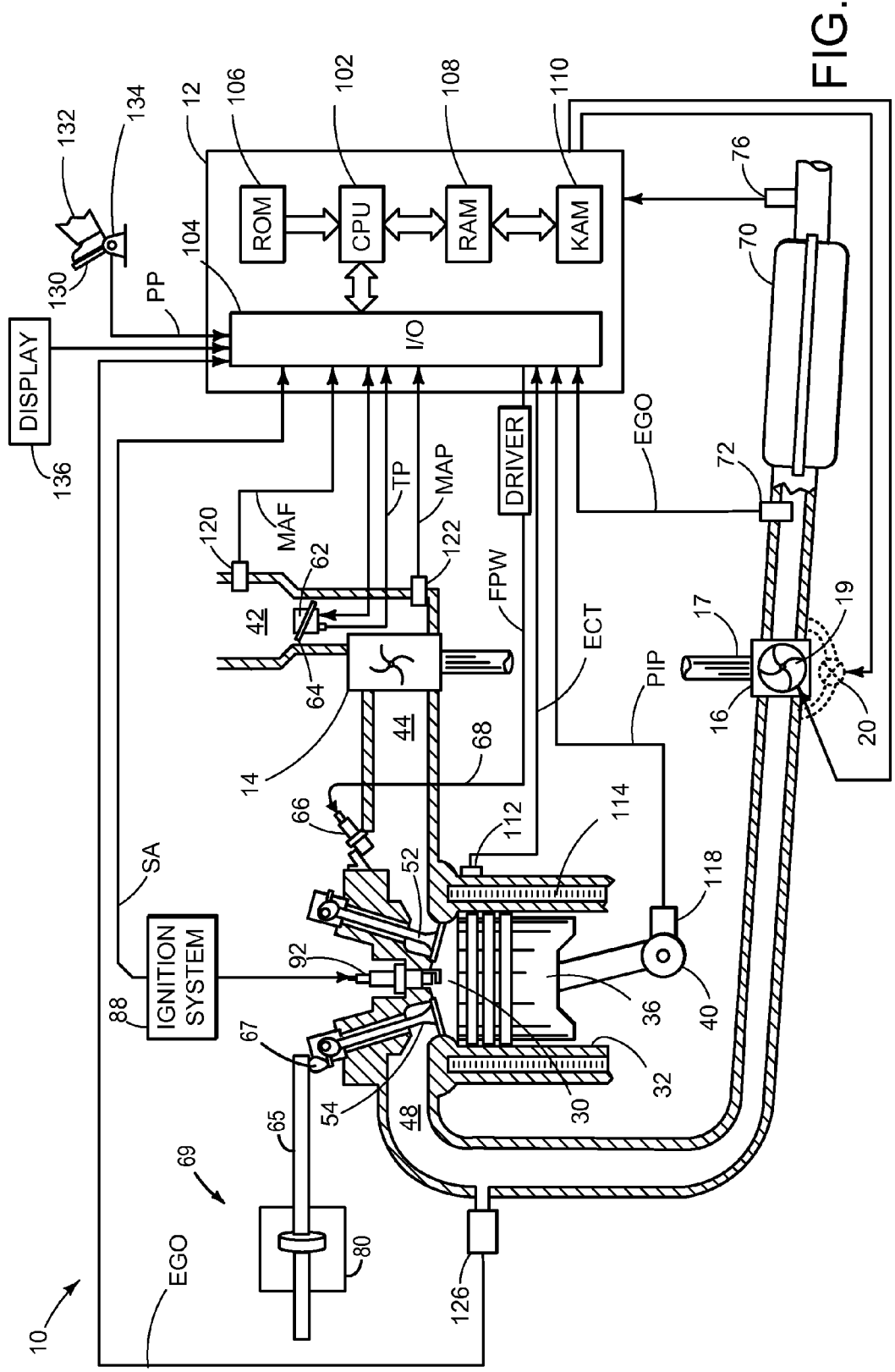
FIG. 1 shows a schematic diagram of an example cylinder of a multi-cylinder engine with an emission control device coupled to the engine exhaust system.
Figure 2:
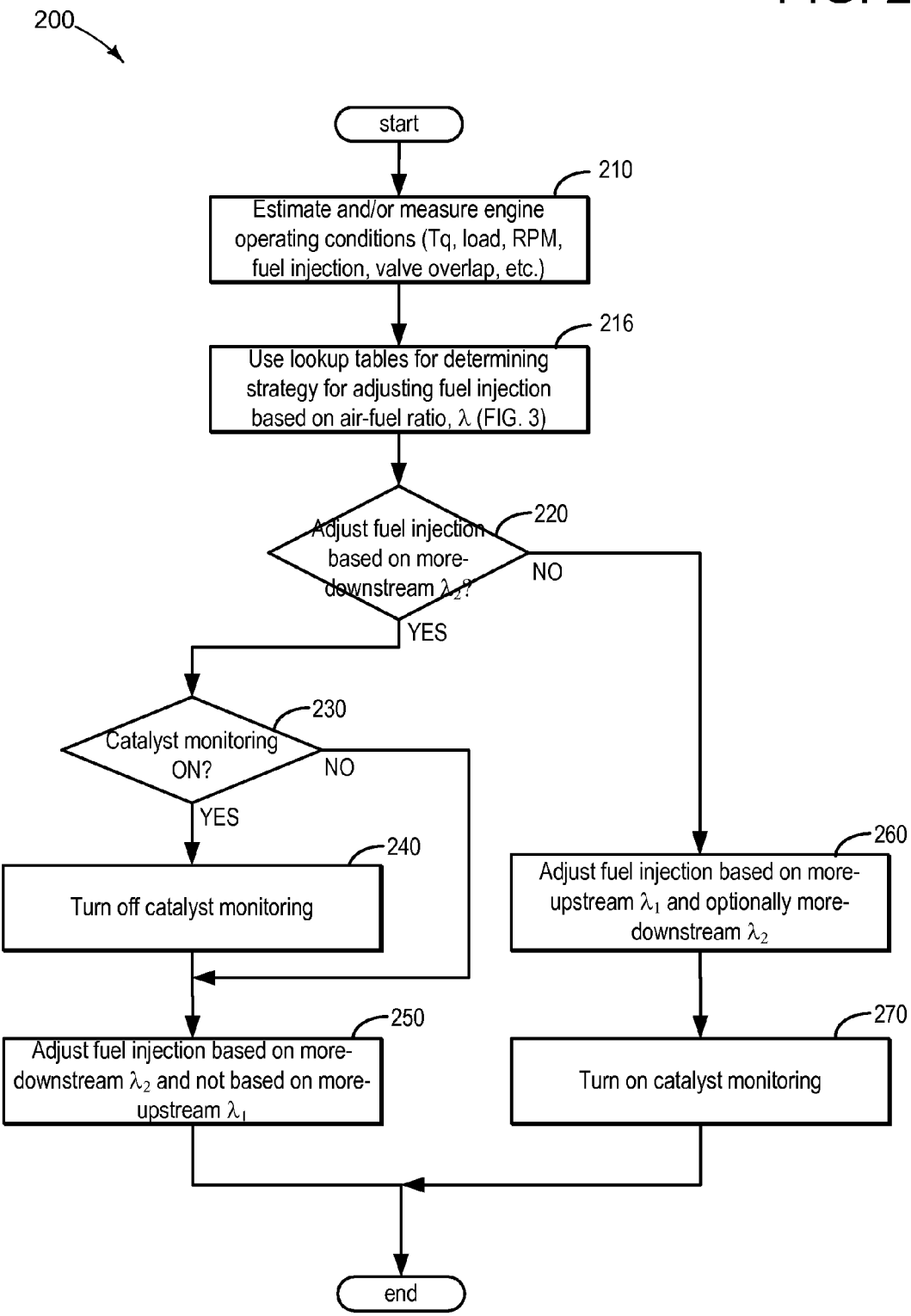
FIGS. 2-3 show flow charts of an example method for operating an engine based on air-fuel ratio.
Figure 3:
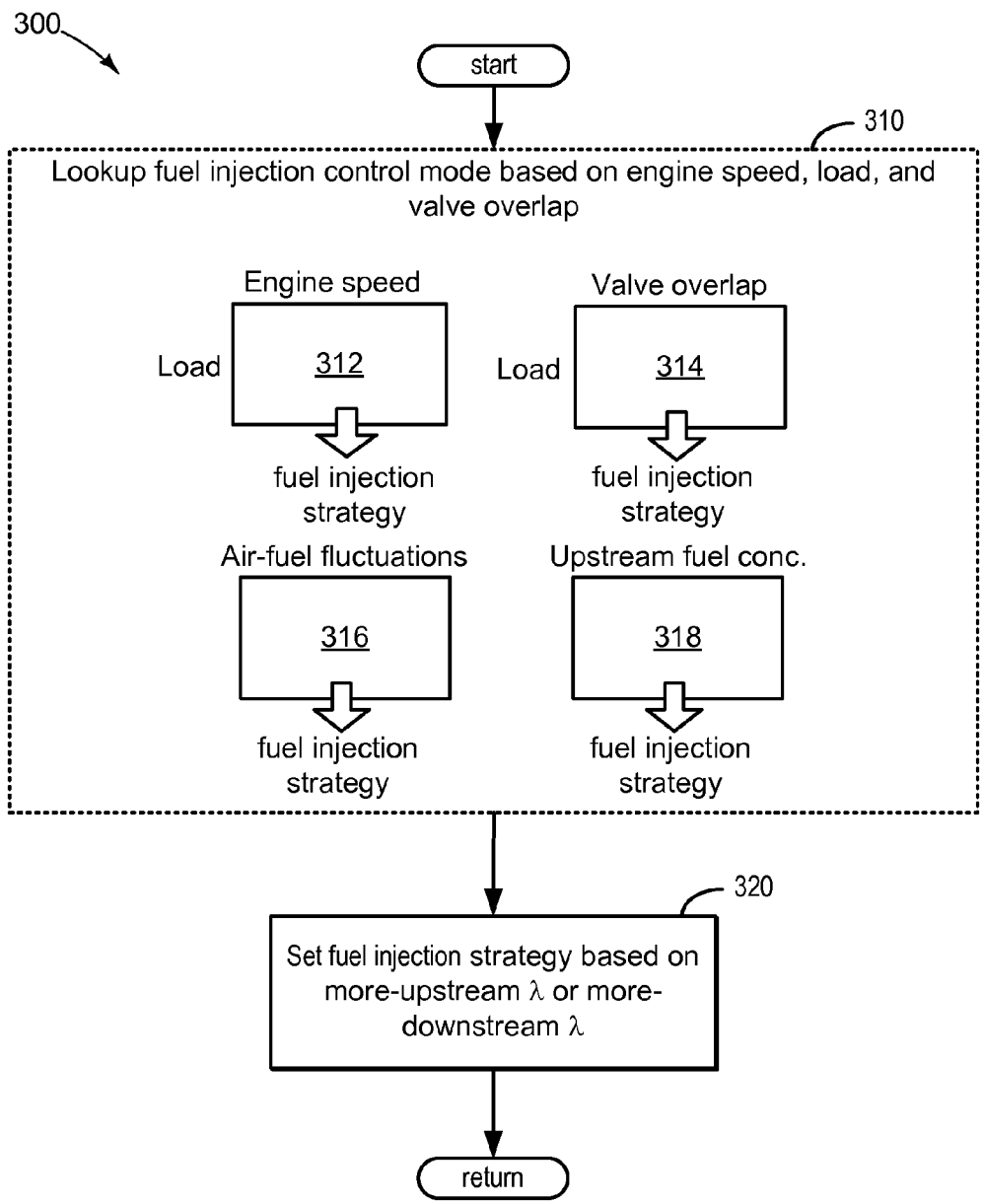
Figure 4:
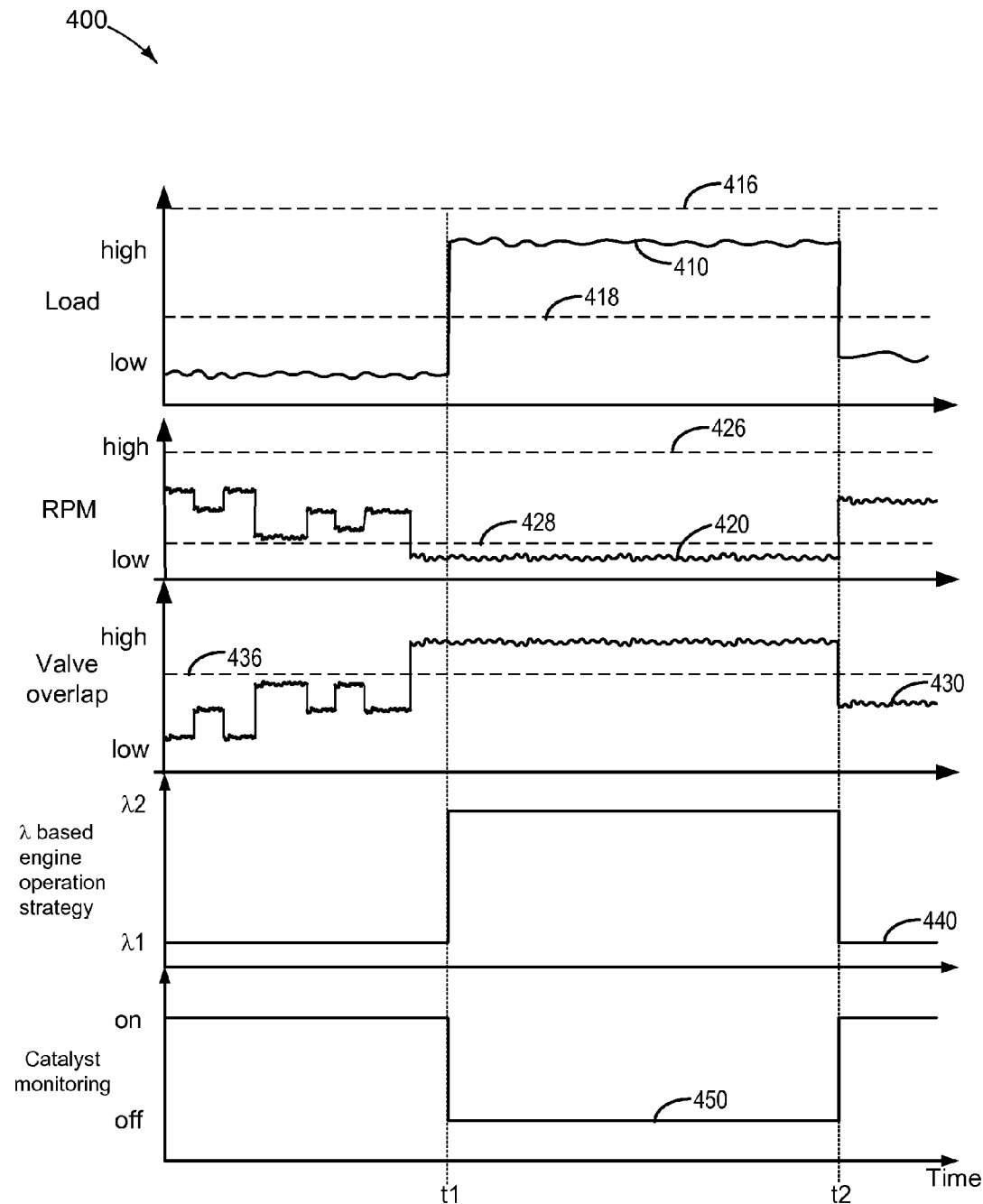
FIG. 4 shows an example timeline for operating an engine based on air-fuel ratio.

The following description relates to a system and method for operating an internal combustion engine by adjusting fuel injection based on a more-upstream air-fuel ratio during a first condition comprising increased scavenging, and by adjusting fuel injection based on a more-downstream air-fuel ratio during a second condition comprising decreased scavenging. FIG. 1 shows an example system comprising a combustion engine, controller, and an emission control device coupled to the exhaust. FIGS. 2 and 3 show flow charts of a method for adjusting fuel injection based on air-fuel ratio in an internal combustion engine, and FIG. 4 illustrates a timeline showing variations in engine operating conditions while executing said method.

Turning to FIG. 1, a schematic diagram showing one cylinder of multi-cylinder engine 10, which may be included in a propulsion system of a vehicle, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (e.g., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection. In some cases, direct injection may provide increased cooling engine cylinders which can reduce knocking and allow for higher compression ratios and increased engine efficiency as compared to operation without direct fuel injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via a spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, particulate filter, various other emission control devices, or combinations thereof. As an example, an engine may be operated at an overall stoichiometric air-fuel ratio in order to reduce NOx emissions. In some embodiments, during operation of engine 10, emission control device 70 may be periodically reset by operating at least one cylinder of the engine within a particular air/fuel ratio.

Full-volume exhaust gas sensor 76 is shown coupled to exhaust passage 48 downstream of emission control device 70. Sensor 76 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Further, a plurality of exhaust gas sensors may be located at partial volume locations within the emission control devices. Other sensors 72 such as an air mass (AM) sensor, additional EGO sensor, and/or a temperature sensor may be disposed upstream of emission control device 70 to monitor the AM, oxygen content, and temperature, respectively, of the exhaust gas entering the emission control device. The sensor locations shown in FIG. 1 are just one example of various possible configurations. For example, the emission control system may include a partial volume set-up with close coupled catalysts.

Compressor 14 draws air from air intake passage 42 to supply boost intake passage 44. Exhaust-gases spin turbine 16 which is coupled to compressor 14 via shaft 17. In some examples, a charge or intake air cooler may also be provided (not shown). Compressor speed may be adjusted via adjusting a position of variable vane control or compressor bypass valve. In alternative examples, a waste gate 20 may replace or be used in addition to variable vane control. Variable vane control may adjust a position of variable geometry vanes 19 of turbine 16. Exhaust-gases can pass through turbine 16 supplying little energy to rotate turbine 16 when vanes 19 are in an open position. Exhaust-gases can pass through turbine 16 and impart increased force on turbine 16 when vanes 19 are in a closed position. Alternatively, waste gate 20 allows exhaust-gases to flow around turbine 16 so as to reduce the amount of energy supplied to the turbine 16. Furthermore, turbine 16 may be a turbine with fixed geometry. A compressor bypass valve (not shown) may allow compressed air at the outlet of compressor 14 to be returned to the input of compressor 14. In this way, the efficiency of compressor 14 may be reduced so as to affect the flow of compressor 14 and reduce the possibility of compressor surge. In this way, the engine may comprise a turbocharged engine. In other examples, the engine may comprise a supercharged engine, wherein a supercharger compressor 14 is used to compress the intake air, but the compressor is not coupled to a shaft and is not driven by an exhaust turbine. Power for a supercharger compressor can be provided mechanically by a belt, gear, shaft, or chain connected to the engine's crankshaft, for example.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; AM and/or temperature of the exhaust gas entering the catalyst from sensor 72; exhaust gas air to fuel ratio from sensor 76; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses for each revolution of the crankshaft. Additionally, controller 12 may communicate with a cluster display device 136, for example to alert the driver of faults in the engine or exhaust after-treatment system.

Storage medium read-only memory 106 can be programmed with computer readable data representing instructions executable by processor 102 for performing the methods described below as well as other variants that are anticipated but not specifically listed.

Each combustion chamber (e.g., cylinder) 30 may be serviced by one or more valves. In the present example, each cylinder 30 includes a corresponding intake valve 52 and an exhaust valve 54. Engine system 100 further includes one or more camshafts 65 for operating intake valve 52 and/or exhaust valve 54. In the depicted example, intake camshaft 65 is coupled to intake valve 52 and can be actuated to operate intake valve 52. In some embodiments, where the intake valve of a plurality of cylinders 30 are coupled to a common camshaft, intake camshaft 65 can be actuated to operate the intake valves of all the coupled cylinders.

Intake valve 52 is actuatable between an open position that allows intake air into the corresponding cylinder and a closed position substantially blocking intake air from the cylinder. Intake camshaft 65 may be included in intake valve actuation system 69. Intake camshaft 65 includes intake cam 67 which has a cam lobe profile for opening intake valve 52 for a defined intake duration. In some embodiments (not shown), the camshaft may include additional intake cams with an alternate cam lobe profile that allows the intake valve 52 to be opened for an alternate duration (herein also referred to as a cam profile switching system). Based on the lobe profile of the additional cam, the alternate duration may be longer or shorter than the defined intake duration of intake cam 67. The lobe profile may affect cam lift height, cam duration, and/or cam timing. A controller may be able to switch the intake valve duration by moving intake camshaft 65 longitudinally and switching between cam profiles.

In the same manner, each exhaust valve 54 is actuatable between an open position allowing exhaust gas out of the corresponding cylinder and a closed position substantially retaining gas within the cylinder. It will be appreciated that while only intake valve 52 is shown to be cam-actuated, exhaust valve 54 may also be actuated by a similar exhaust camshaft (not shown). In some embodiments, where the exhaust valve of a plurality of cylinders 30 is coupled to a common camshaft, the exhaust camshaft can be actuated to operate the exhaust valves of all the coupled cylinders. As with intake camshaft 65, when included, the exhaust camshaft may include an exhaust cam having a cam lobe profile for opening exhaust valve 54 for a defined exhaust duration. In some embodiments, the exhaust camshaft may further include additional exhaust cams with an alternate cam lobe profile that allows exhaust valve 54 to be opened for an alternate duration. The lobe profile may affect cam lift height, cam duration, and/or cam timing. A controller may be able to switch the exhaust valve duration by moving the exhaust camshaft longitudinally and switching between cam profiles.

It will be appreciated that the intake and/or exhaust camshafts may be coupled to cylinder subsets, and multiple intake and/or exhaust camshafts may be present. For example, a first intake camshaft may be coupled to the intake valves of a first subset of cylinders while a second intake camshaft may be coupled to the intake valves of a second subset of cylinders. Likewise, a first exhaust camshaft may be coupled to the exhaust valves of a first subset of cylinders while a second exhaust camshaft may be coupled to the exhaust valves of a second subset of cylinders. Further still, one or more intake valves and exhaust valves may be coupled to each camshaft. The subset of cylinders coupled to the camshaft may be based on their position along an engine block, their firing order, the engine configuration, etc.

Intake valve actuation system 69 and exhaust valve actuation system (not shown) may further include push rods, rocker arms, tappets, etc. Such devices and features may control actuation of the intake valve 52 and the exhaust valve 54 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 30 may each have more than one exhaust valve and/or intake valve. In still other examples, each of the exhaust valve 54 and intake valve 52 of one or more cylinders may be actuated by a common camshaft. Further still, in some examples, some of the intake valves 52 and/or exhaust valves 54 may be actuated by their own independent camshaft or other device.

Engine system 100 may include variable valve timing (VVT) systems, for example, variable cam timing (VCT) system 80. A variable valve timing system may be configured to open an intake valve for a first duration and an exhaust valve for a second duration. The first and second duration may be based on engine operating conditions. In one example, the first and second durations may be adjusted based on mass air flow and a condensate level in the CAC.

VCT system 80 may be a twin independent variable camshaft timing system, for changing intake valve timing and exhaust valve timing independently of each other. VCT system 80 may include an intake camshaft phaser coupled to the common intake camshaft 65 for changing intake valve timing. The VCT system may likewise include an exhaust camshaft phaser coupled to a common exhaust camshaft for changing exhaust valve timing. VCT system 80 may be configured to advance or retard valve timing by advancing or retarding cam timing and may be controlled by controller 38. VCT system 80 may be configured to vary the timing of valve opening and closing events by varying the relationship between the crankshaft position and the camshaft position. For example, VCT system 80 may be configured to rotate intake camshaft 65 independently of the crankshaft to cause the valve timing to be advanced or retarded. In some embodiments, VCT system 80 may be a cam torque actuated device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be hydraulically powered, or electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from VCT system 80.

By adjusting VCT system 80, a position of intake camshaft 65 can be adjusted to thereby vary an opening and/or closing timing of intake valve 52. As such, by varying the opening and closing of intake valve 52, an amount of positive valve overlap between intake valve 52 and exhaust valve 54 can be varied. For example, VCT system 80 may be adjusted to advance or retard an opening and/or a closing of intake valve 52 relative to a piston position.

During engine operation, a cylinder piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke. During cylinder combustion, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

Based on the timing differences between exhaust valve closing and intake valve opening, the valves may be operated with negative valve overlap wherein for a short duration after the end of the exhaust stroke and before the commencement of the intake stroke, both intake and exhaust valves are closed. This period, during which both valves are closed, is referred to as negative (intake to exhaust) valve overlap. In one example, the VCT system may be adjusted so that the negative intake to exhaust valve overlap timing may be a default cam position of the engine during cylinder combustion.

Alternatively, the valves may be operated with positive valve overlap wherein for a short duration before the end of the exhaust stroke and after the commencement of the intake stroke, both intake and exhaust valves may be open. This period, during which both valves may be open, is referred to as a positive (intake to exhaust) valve overlap. As elaborated herein, the VCT system 80 may be adjusted so that an amount of positive valve overlap during selected engine operating conditions is increased. Specifically, a position of the intake camshaft may be adjusted such that an opening of the intake valve timing is advanced. Consequently, the intake valve may be opened earlier, before the end of the exhaust stroke. As such, a duration over which both valves are open may be increased, thereby leading to increased positive valve overlap. As one example, positive valve overlap may be increased by moving the intake camshaft from a position of some positive valve overlap to a position having more positive valve overlap. As another example, positive valve overlap may be increased by moving the intake camshaft from a position of negative valve overlap to a position of positive valve overlap. In one example, the VCT system may be adjusted so that the negative intake to exhaust valve overlap timing may be a default cam position of the engine during an engine cold-start.

It will be appreciated that while the above example suggests increasing positive valve overlap by advancing intake opening timing, in alternate examples, positive valve overlap may be increased by adjusting an exhaust camshaft to retard exhaust valve closing. Further still, each of the intake and the exhaust camshafts may be adjusted to vary the positive valve overlap by varying both the intake and the exhaust valve timings.

FIG. 1 also shows a controller 38, which may be any electronic control system of the vehicle in which engine system 10 is installed. In embodiments where at least one intake or exhaust valve is configured to open and close according to an adjustable timing, the adjustable timing may be controlled via the electronic control system to regulate an amount of exhaust present in a combustion chamber during ignition. For example, positive valve overlap may be increased in order to scavenge combusted exhaust gases from the engine cylinders. By scavenging cylinder exhaust gases, engine knocking may be reduced, allowing engine operation at higher compression ratios and higher efficiencies, and increasing available torque output. Scavenging may be particularly advantageous at low engine speeds for increasing engine performance, where available torque may be reduced and engine efficiencies are lower as compared to higher engine speeds.

During scavenging, fuel injection may be adjusted so that the in-cylinder air-fuel ratio is richer than stoichiometric in order to balance the increased scavenging intake air flow rate so that overall stoichiometric air-fuel engine operation can be achieved. However, during positive valve overlap, intake air may directly pass through the engine cylinders while the intake valve 52 and exhaust valve 54 are simultaneously open. Furthermore, the upstream exhaust gas, particularly near the engine cylinders, may be inhomogeneously mixed. As a result, more-upstream exhaust air-fuel ratios, particularly nearer the engine cylinders, may be measured as leaner than the overall engine air-fuel ratio. For example, during increased scavenging, a more-upstream exhaust air-fuel sensor measurement may read lean even though the engine may be operating at an overall stoichiometric air-fuel ratio. Accordingly, during conditions of increased scavenging, it may be advantageous to operate an engine based on a more-downstream air-fuel ratio. The more-downstream air-fuel ratio may be measured, for example, by an EGO sensor downstream from an emission control device 70. Inhomogoeneously-mixed exhaust gases may be more homogeneously mixed after passing through emissions control device where a downstream EGO sensor may be located. Thus, during increased scavenging conditions, a more-downstream air-fuel ratio may more accurately infer an overall air-fuel ratio as compared to a more-upstream air-fuel ratio. Furthermore, uncombusted fuel components in the exhaust may be removed or consumed by reaction in the emissions control device, and may not reach the downstream EGO sensor. As a result, engine operation, for example adjusting fuel injection, based on a more-downstream air-fuel ratio may be more reliable as compared to engine operation based on a more-upstream air-fuel ratio, during increased scavenging conditions. More reliable engine operation may include increased efficiency, reduced knocking, and the like.

Furthermore, adjusting fuel injection based on a more-downstream air fuel ratio may allow for increased scavenging balanced by richer engine cylinder air-fuel ratios. For example, during increased scavenging, fuel injection may be adjusted so that an engine cylinder air-fuel ratio is less than a threshold air-fuel ratio, and so that one or more more-downstream air-fuel ratios are stoichiometric air-fuel ratios. In one example, the threshold air-fuel ratio may be 0.9 and the one or more more-downstream stoichiometric air-fuel ratios may be 1. In another example, the threshold air-fuel ratio may be 0.85.

In contrast, increased scavenging and operating at richer engine cylinder air-fuel ratios while adjusting fuel injection based on a more-upstream air fuel ratio may result in unreliable engine control because the more-upstream air-fuel sensor may be corrupted by inhomogenously mixed pass-through air from the increased scavenging as well as the presence of uncombusted fuel components.

The electronic control system may also be configured to command the opening, closure and/or adjustment of various other electronically actuated valves in the engine system as needed to enact any of the control functions described herein. These valves may include throttle valves, compressor by-pass valves, waste gates, EGR valves and shut-off valves, various reservoir intake and exhaust valves, for example. The controller may also adjust the amount of fuel, as well as injection timing, of the fuel injectors. As such, the controller may adjust the VCT system and an air-fuel ratio. Further, to assess operating conditions in connection with the control functions of the engine system, the controller may be operatively coupled to a plurality of sensors arranged throughout the engine system. These may include flow sensors, temperature sensors, pedal-position sensors, pressure sensors, a mass air flow sensor, etc. Specifically, a pedal position sensor 134 is shown coupled to an accelerator pedal 130 for sensing force applied by vehicle operator 132. The controller 38 may use data from these various sensors to estimate other engine operating conditions.

Turning now to FIG. 2, it illustrates a method 200 of operating an engine by adjusting fuel injection based on air-fuel ratio. Method 200 begins at 210, where engine operating conditions such as torque, load, engine speed (RPM), fuel injection, valve overlap, and the like are estimated and/or measured. At 216, method 200 may use one or more lookup tables to determine an engine operating strategy (e.g., adjusting fuel injection) based on air-fuel ratio, $\lambda$. For example, under certain conditions, adjusting fuel injection may be operated based solely on a more-downstream air-fuel ratio, $\lambda_2$. In contrast, under certain other engine operating conditions, adjusting fuel injection may be operated based on a more-upstream air-fuel ratio, $\lambda_1$ or based on both $\lambda_1$ and $\lambda_2$.

Turning now to FIG. 3, example lookup tables 312, 314, 316 and 318 are shown at 310. Lookup tables 312, 314, 316 and 318 may be populated during predetermined offline characterization of the engine, and/or may also be populated using online engine characterization measurements. In one example, based on engine speed and load, lookup table 312 may output adjusting fuel injection based on an air-fuel ratio. For instance, during a second condition comprising increased scavenging, engine operation may be based on a more-downstream air-fuel ratio and not on a more-upstream air-fuel ratio. The second condition may further comprise an engine speed less than one-third a threshold engine speed, and an engine load greater than one-half a threshold engine load. The second condition may further comprise an engine speed being less than one-quarter the threshold engine speed and/or the engine load greater than three-quarters the threshold engine load. In one example, the threshold engine speed may refer to a maximum available engine speed, and the threshold engine load may refer to a maximum available engine load for a vehicle. On the other hand, during a first condition, wherein an engine speed is less than one-third a threshold engine speed and an engine load is greater than one-half a threshold engine load, scavenging may be reduced, and engine operation may be based on a more-upstream air-fuel ratio. The more-downstream air-fuel ratio may be inferred by an EGO sensor positioned downstream from the emission control device, and the more-upstream air-fuel ratio may be inferred by an EGO sensor upstream from the emission control device.

In another example, based on valve overlap and load, lookup table 314 may output adjusting fuel injection based on an air-fuel ratio. For instance, during a second condition comprising increased scavenging, engine operation may be based on a more-downstream air-fuel ratio and not on a more-upstream air-fuel ratio. For example, the second condition may comprise when a valve overlap is larger and when the engine load is greater than one-half a threshold engine load. On the other hand, during a first condition, wherein an engine speed is less than one-third a threshold engine speed and an engine load is greater than one-half a threshold engine load, scavenging may be reduced, and engine operation may be based on a more-upstream air-fuel ratio. The first condition may comprise when a valve overlap is smaller and when the engine load is less than one-half a threshold engine load. Furthermore, the valve overlap being larger may correspond to a valve overlap being greater than a threshold valve overlap, and the valve overlap being smaller may correspond to a valve overlap being smaller than a threshold valve overlap.

As a further example, based on air-fuel fluctuations, lookup table 316 may output adjusting fuel injection based on an air-fuel ratio. In particular, if the rate of change in air-fuel ratio is larger than a threshold rate of change, lookup table 316 may output adjusting fuel injection based on a more-upstream air-fuel ratio. As an example, during the second condition in which adjusting fuel injection is based on a more-downstream air-fuel ratio and not based on a more-upstream air-fuel ratio, if air-fuel fluctuations or a rate of change in air-fuel ratio is larger than a threshold rate of change, scavenging may be reduced and engine operation may be switched to adjusting fuel injection based on the more-upstream air-fuel ratio. Reducing scavenging may comprising adjusting valve timing or valve overlap during the second condition to reduce scavenging to the decreased scavenging levels of the first condition. Adjusting fuel injection based on a more-downstream air-fuel ratio may increase air-fuel ratio fluctuations relative to adjusting fuel injection based on a more-upstream air-fuel ratio because of transport and/or time delays between the cylinder and the more-downstream EGO sensor, for example. Accordingly, switching adjusting the fuel injection from being based on a more-downstream air-fuel ratio to being based on a more-upstream air-fuel ratio may reduce air-fuel ratio fluctuations, and increase engine performance and reliability.

As a further example, based on upstream exhaust fuel concentration, lookup table 318 may output adjusting fuel injection based on an air-fuel ratio. For example, if an upstream fuel concentration is greater than a threshold amount of fuel, lookup table 318 may output adjusting fuel injection based on a more-downstream air-fuel ratio and not based on a more-upstream air-fuel ratio since the upstream fuel concentration may corrupt a more-upstream air-fuel ratio sensor measurement. On the other hand, if the upstream fuel concentration is less than the threshold amount of fuel, lookup table 318 may output adjusting fuel injection based on a more-upstream air-fuel ratio. The upstream fuel concentration may be inferred from one or more of intake air flow and fuel injection flow rates, EGO sensors, and the like. Furthermore, the threshold fuel amount may depend on the EGO sensor type. Accordingly, lookup table 318 may also include data for intake air flow and fuel injection flow rates, and EGO sensors, and the like.

Further still, at 310, a combination of one or more of lookup tables 312, 314, 316, and 318 may be used to determine a strategy for adjusting fuel injection based on air-fuel ratio. After 310, method 300 continues at 320 where the strategy for adjusting fuel injection based on air-fuel ratio determined in 310 is set. After 320, method 300 returns to method 200 at 220. Method 200 determines at 220 whether adjusting fuel injection is based on a more-downstream air-fuel ratio, $\lambda_2$, and not on more-upstream air-fuel ratio, $\lambda_1$.

If adjusting fuel injection is based on a more-downstream air-fuel ratio, $\lambda_2$ and not on more-upstream air-fuel ratio, $\lambda_1$, then method 200 continues at 230 where it is determined if catalyst monitoring is ON. If the catalyst monitoring is on, then the catalyst monitoring may be turned off at 240. Catalyst monitoring may determine catalyst degradation based on EGO sensors (e.g., sensors 126, 72, 76) positioned upstream and downstream from an emission control device 70. For example a catalyst monitoring system may evaluate useful catalyst life and/or catalyst degradation based on transitions and/or switching of the downstream EGO sensor. Accordingly, adjusting fuel injection based on a more-downstream air-fuel ratio, $\lambda_2$ may interfere with catalyst monitoring and vice versa. Thus, by turning catalyst monitoring off when adjusting fuel injection based on a more-downstream air-fuel ratio, $\lambda_2$, both catalyst monitoring and adjusting fuel injection can be more reliably performed. If the catalyst monitoring is OFF, then method 200 continues from 230 at 250.

Next, at 250, method 200 may adjust the fuel injection based on the more-downstream air-fuel ratio, $\lambda_2$ and not based on the more-upstream air-fuel ratio, $\lambda_1$. Continuing from 220, if method 200 determines that adjusting fuel injection is not based on a more-downstream $\lambda_2$, then method 200 continues at 260, where adjusting fuel injection is based on more-upstream $\lambda_1$. Optionally, adjusting fuel injection may be based on both more-upstream and more-downstream air-fuel ratios, $\lambda_1$ and $\lambda_2$, respectively. Next at 270, method 200 may turn on catalyst monitoring. After 250 and 270, method 200 ends.

Turning now to FIG. 4, it illustrates a timeline 400 of an example method for adjusting fuel injection based on air-fuel ratio. Variations in engine load 410, engine speed (RPM) 420, valve overlap 430, and catalyst monitoring status 450 are plotted in timeline 400. A $\lambda$-based engine operation strategy is indicated by 440. Furthermore, timeline 400 also illustrates threshold engine load 416, half threshold engine load 418, threshold RPM 426, one-quarter threshold RPM 428, and threshold valve overlap 436.

Prior to t1, engine load 410 is low (e.g., less than half of threshold engine load 416), engine speed 420 is less than threshold engine RPM 426, and valve overlap 430 fluctuates below threshold valve overlap 436. Based on these engine operating conditions, the method for adjusting fuel injection based on air-fuel ratio (e.g., method 200 and 300), may set adjusting fuel injection based on a more-upstream air-fuel ratio, $\lambda_1$. Furthermore, prior to t1, catalyst monitoring may be ON since adjusting fuel injection is based on a more-upstream air-fuel ratio.

At t1, in response to engine load 410 increasing above half threshold engine load 418, and in response to engine RPM 420 decreasing below one-quarter the threshold engine RPM 428, adjusting fuel injection may be set to be based on a more-downstream air-fuel ratio $\lambda_2$, and not based on a more-upstream air-fuel ratio, $\lambda_1$ as shown by 440. Furthermore, in response to this switch in strategy for adjusting fuel injection, catalyst monitoring status 450 may be set to OFF. Also at t1, valve overlap increases above threshold valve overlap 436 from a first condition of decreased scavenging to a second condition of increased scavenging. Increasing valve overlap at t1 increases scavenging of engine cylinders which helps to purge combusted exhaust gases from the engine cylinders allowing higher compression ratios, increased engine efficiencies, reduced engine knocking, and increased engine performance At t2, the engine load 410 decreases below half threshold engine load 418 and engine RPM 420 increases above one-quarter threshold engine RPM 428. In response, adjusting fuel injection may be switched to be based on more-upstream air-fuel ratio $\lambda_1$ as indicated by 440, catalyst monitoring 450 may be switched on, and valve overlap 430 may be reduced below threshold valve overlap 436 to decrease scavenging.

As described above, the method for adjusting fuel injection based on air-fuel ratio may further be set based on engine speed, valve overlap, and fluctuation in air-fuel ratio, relative to a threshold engine speed, a threshold valve overlap, and a threshold rate of change in air-fuel ratio, respectively.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
    during a first condition comprising decreased scavenging, adjusting fuel injection based on a more-upstream air-fuel ratio; and
    during a second condition comprising increased scavenging, stopping monitoring of an emission control device, and adjusting fuel injection based on one or more more-downstream air-fuel ratios and not based on the more-upstream air-fuel ratio.

2. The method of claim 1, wherein during the first condition, adjusting fuel injection is further based on the one or more more-downstream air-fuel ratios.

3. The method of claim 1, wherein the engine is boosted via a turbocharger.

4. The method of claim 1, further comprising increasing valve overlap to increase scavenging and reducing valve overlap to decrease scavenging.

5. The method of claim 4, further comprising in response to air-fuel fluctuations being greater than a threshold air-fuel fluctuation level,
    reducing valve overlap during the second condition to reduce scavenging to the decreased scavenging of the first condition; and then
    adjusting fuel injection based on the one or more more-downstream air-fuel ratios and not based on the more-upstream air-fuel ratio.

6. The method of claim 1, wherein the second condition further comprises engine speeds less than one-third a threshold engine speed and engine loads greater than one-half a threshold engine load.

7. The method of claim 6, wherein the second condition further comprises engine speeds less than one-quarter the threshold engine speed.

8. The method of claim 6, wherein the second condition further comprises engine loads greater than three-quarters the threshold engine load.

9. The method of claim 1, wherein the second condition further comprises engine loads greater than one-half a threshold engine load and a larger valve overlap, and wherein the first condition further comprises engine loads less than one-half a threshold engine load and a smaller valve overlap.

10. The method of claim 1, wherein adjusting the fuel injection during the second condition comprises adjusting the fuel injection so that an engine cylinder air-fuel equivalent ratio is less than 0.9, and one of the one or more more-downstream air-fuel equivalent ratios is 1.

11. The method of claim 10, wherein adjusting the fuel injection during the second condition comprises adjusting the fuel injection so that an engine cylinder air-fuel equivalent ratio is less than 0.85, and one of the one or more more-downstream air-fuel equivalent ratios is 1.

12. The method of claim 1, wherein the more-upstream air-fuel ratio is measured upstream of the emission control device.

13. The method of claim 1, wherein one of the one or more more-downstream air-fuel ratios is measured downstream of the emission control device.

14. The method of claim 1, wherein the more-upstream air-fuel ratio and the one or more more-downstream air-fuel ratios are measured by a more-upstream exhaust gas oxygen sensor and one or more more-downstream exhaust gas oxygen sensors, respectively.

15. The method of claim 14, further comprising in response to an amount of fuel at the more-upstream exhaust gas oxygen sensor being greater than a threshold amount of fuel, adjusting fuel injection based on the one or more more-downstream air-fuel ratios and not based on the more-upstream air-fuel ratio.

16. A method for a fuel-injected, turbocharged engine, comprising:
during a first condition comprising an engine speed greater than one-third a threshold engine speed and a load greater than one-half a threshold load, operating the engine with decreased scavenging and adjusting fuel injection based on a more-upstream air-fuel ratio; and
during a second condition comprising the engine speed less than one-third the threshold engine speed and the load greater than one-half the threshold load, stopping monitoring of an emission control device, and operating the engine with increased scavenging and adjusting fuel injection based on one or more more-downstream air-fuel ratios and not based on the more-upstream air-fuel ratio.

17. The method of claim 16, wherein operating the engine with increased scavenging comprises operating the engine with increased engine intake and engine exhaust valve overlap, and operating the engine with decreased scavenging comprises operating the engine with decreased engine intake and engine exhaust valve overlap.

18. The method of claim 17, wherein the more-upstream air-fuel ratio is measured upstream of the emission control device and one of the one or more more-downstream air-fuel ratios is measured downstream of the emission control device.

19. A system, comprising:
an engine;
a more-upstream exhaust gas oxygen sensor;
a more-downstream exhaust gas oxygen sensor;
an emission control device; and
a controller with instructions executable to:
during a first condition comprising decreased scavenging, adjusting fuel injection based on a more-upstream air-fuel ratio; and
during a second condition comprising increased scavenging, stopping monitoring of the emission control device, and adjusting fuel injection based on one or more more-downstream air-fuel ratios and not based on the more-upstream air-fuel ratio.

20. The system of claim 19, wherein the more-upstream exhaust gas oxygen sensor is positioned upstream of the emission control device, and wherein the more-downstream exhaust gas oxygen sensor is positioned downstream of the emission control device.

* * * * *